United States Patent
Shroff et al.

(10) Patent No.: US 11,816,653 B2
(45) Date of Patent: Nov. 14, 2023

(54) GPS DETERMINED LOCATION BASED ACCESS TO LINKED INFORMATION AND DELIVERY THEREOF

(71) Applicant: Groupon, Inc., Chicago, IL (US)

(72) Inventors: Rajat Shroff, Redwood Shores, CA (US); Aaron Cooper, Chicago, IL (US); Elton Cheung, Millbrae, CA (US); Tyler Renaghan, San Anselmo, CA (US); James J. Sullivan, Piedmont, CA (US)

(73) Assignee: GROUPON, INC., Chicago, IL (US)

( * ) Notice: Subject to any disclaimer, the term of this patent is extended or adjusted under 35 U.S.C. 154(b) by 525 days.

(21) Appl. No.: 15/847,442

(22) Filed: Dec. 19, 2017

(65) Prior Publication Data

US 2018/0174130 A1    Jun. 21, 2018

Related U.S. Application Data

(60) Provisional application No. 62/436,266, filed on Dec. 19, 2016.

(51) Int. Cl.
*G06Q 30/00* (2023.01)
*G06Q 20/32* (2012.01)
(Continued)

(52) U.S. Cl.
CPC ....... *G06Q 20/3224* (2013.01); *G06Q 20/325* (2013.01); *G06Q 20/327* (2013.01);
(Continued)

(58) Field of Classification Search
None
See application file for complete search history.

(56) References Cited

U.S. PATENT DOCUMENTS 5,642,485 A * 6/1997 Deaton .............. G06Q 30/0255
                                                      705/14.38
5,649,114 A * 7/1997 Deaton ................ G06Q 20/387
                                                      705/14.35
(Continued)

FOREIGN PATENT DOCUMENTS

JP    2007200013 A * 8/2007 ............. G06F 17/30
JP    2011023798 A * 2/2011 ............. G06Q 20/02
(Continued)

OTHER PUBLICATIONS

• Krista Becker. "Mobile Phone: The New Way to Pay?" (2007). Retrieved online Nov. 18, 2022. https://www.bostonfed.org/-/media/Documents/economic/cprc/publications/briefings/mobilephone.pdf (Year: 2007).*

(Continued)

*Primary Examiner* — James A Reagan
(74) *Attorney, Agent, or Firm* — Alston & Bird LLP

(57) ABSTRACT

Various methods are provided for facilitating access to linked information to GPS or short-range wireless equipped devices. One example method may comprise receiving, via a network, an indication of an interaction between a primary device and a third-party device, the indication comprising at least a first element and a second element, the first element indicative of user identification information and the second element indicative of at least one of a location or a bounded region, determining, as a function of at least the first element and the second element, a data object that upon validation is configured for use a subsequent interaction, and transmitting, to a mobile device, an electronic communication comprising an indication, configured for rendering on the mobile device, of the data object.

51 Claims, 7 Drawing Sheets

(51) Int. Cl.
| | | |
|---|---|---|
| *G06Q 20/34* | (2012.01) | |
| *G06Q 20/40* | (2012.01) | |
| *G06Q 30/0251* | (2023.01) | |
| *G06Q 30/0207* | (2023.01) | |
| *G06Q 30/0238* | (2023.01) | |
| *G06Q 30/0234* | (2023.01) | |
| *G01S 19/42* | (2010.01) | |
| *G06Q 20/02* | (2012.01) | |
| *H04W 4/80* | (2018.01) | |
| *G06N 20/00* | (2019.01) | |
| *G06F 16/951* | (2019.01) | |

(52) U.S. Cl.
CPC ......... *G06Q 20/34* (2013.01); *G06Q 20/4014* (2013.01); *G06Q 30/0222* (2013.01); *G06Q 30/0224* (2013.01); *G06Q 30/0234* (2013.01); *G06Q 30/0238* (2013.01); *G06Q 30/0239* (2013.01); *G06Q 30/0259* (2013.01); *G06Q 30/0261* (2013.01); *G06Q 30/0267* (2013.01); *G01S 19/42* (2013.01); *G06F 16/951* (2019.01); *G06N 20/00* (2019.01); *G06Q 20/02* (2013.01); *H04W 4/80* (2018.02)

(56) References Cited

U.S. PATENT DOCUMENTS

| | | | | |
|---|---|---|---|---|
| 6,334,108 | B1 * | 12/2001 | Deaton | G06Q 30/0255 |
| | | | | 705/14.27 |
| 6,516,302 | B1 * | 2/2003 | Deaton | G06Q 30/0239 |
| | | | | 705/14.38 |
| 6,684,195 | B1 * | 1/2004 | Deaton | G06Q 20/387 |
| | | | | 705/14.38 |
| 7,945,566 | B2 | 5/2011 | James | G06F 16/24575 |
| | | | | 707/723 |
| 8,504,062 | B2 * | 8/2013 | Weiss | G06Q 30/0261 |
| | | | | 455/456.6 |
| 8,509,734 | B1 * | 8/2013 | Gupta | G06Q 20/3224 |
| | | | | 455/406 |
| 8,612,278 | B1 * | 12/2013 | Ashley, Jr. | H04W 4/80 |
| | | | | 705/7.11 |
| 8,688,517 | B2 * | 4/2014 | Lutnick | G06Q 30/02 |
| | | | | 705/14.1 |
| 8,958,820 | B2 * | 2/2015 | Weiss | G06Q 30/0261 |
| | | | | 455/418 |
| 9,094,816 | B2 * | 7/2015 | Maier | H04W 4/90 |
| 9,373,130 | B2 * | 6/2016 | Weiss | H04W 64/00 |
| 9,471,925 | B2 * | 10/2016 | Ramer | G06Q 10/10 |
| 9,635,534 | B2 * | 4/2017 | Maier | H04W 4/023 |
| 9,665,858 | B1 * | 5/2017 | Kumar | G06Q 20/42 |
| 9,767,474 | B1 * | 9/2017 | Ramalingam | G06Q 30/0239 |
| 10,176,195 | B2 * | 1/2019 | Patel | G06F 16/29 |
| 10,353,941 | B2 * | 7/2019 | Patel | G06F 16/9537 |
| 10,387,881 | B2 * | 8/2019 | Studnitzer | G06Q 20/385 |
| 10,460,310 | B2 * | 10/2019 | Phipps | G06Q 30/0631 |
| 10,482,184 | B2 * | 11/2019 | Gelfenbeyn | G10L 15/22 |
| 10,540,704 | B2 * | 1/2020 | Mazed | H01L 33/0093 |
| 10,546,315 | B2 * | 1/2020 | Mitchell | G06Q 30/0238 |
| 10,977,649 | B2 * | 4/2021 | Studnitzer | G06Q 20/42 |
| 11,232,265 | B2 * | 1/2022 | Gelfenbeyn | G06F 40/279 |
| 11,265,673 | B2 * | 3/2022 | Edge | H04W 4/021 |
| 11,348,107 | B2 * | 5/2022 | Studnitzer | G06Q 20/4014 |
| 11,475,056 | B2 * | 10/2022 | Patel | G06F 16/38 |
| 2004/0267663 | A1 * | 12/2004 | Karns | G06Q 20/10 |
| | | | | 705/40 |
| 2005/0131757 | A1 * | 6/2005 | Chan | G06Q 30/02 |
| | | | | 705/14.55 |
| 2005/0251440 | A1 * | 11/2005 | Bednarek | G06Q 30/0601 |
| | | | | 705/7.32 |
| 2006/0015580 | A1 * | 1/2006 | Gabriel | G06F 21/10 |
| | | | | 709/219 |
| 2008/0306826 | A1 * | 12/2008 | Kramer | G06Q 30/0226 |
| | | | | 705/14.27 |
| 2009/0043738 | A1 * | 2/2009 | James | G06F 16/24578 |
| 2012/0030002 | A1 | 2/2012 | Bous et al. | |
| 2012/0108259 | A1 * | 5/2012 | Weiss | G06Q 30/0267 |
| | | | | 455/456.1 |
| 2012/0215658 | A1 * | 8/2012 | Estrada | G06Q 20/4016 |
| | | | | 705/26.41 |
| 2012/0253913 | A1 * | 10/2012 | Richard | G06Q 20/36 |
| | | | | 705/14.27 |
| 2013/0006773 | A1 * | 1/2013 | Lutnick | G07F 17/3286 |
| | | | | 705/14.58 |
| 2013/0024881 | A1 * | 1/2013 | Liu | G06Q 30/0207 |
| | | | | 725/23 |
| 2013/0046635 | A1 * | 2/2013 | Grigg | G06Q 30/0238 |
| | | | | 705/14.58 |
| 2013/0091452 | A1 * | 4/2013 | Sorden | G06T 17/05 |
| | | | | 715/771 |
| 2013/0173358 | A1 * | 7/2013 | Pinkus | G06Q 30/0265 |
| | | | | 705/14.62 |
| 2013/0316734 | A1 * | 11/2013 | Weiss | H04W 4/021 |
| | | | | 455/456.1 |
| 2013/0317993 | A1 * | 11/2013 | Wasserman | G06Q 30/016 |
| | | | | 705/304 |
| 2014/0074599 | A1 * | 3/2014 | Rappoport | G06Q 30/0251 |
| | | | | 705/14.51 |
| 2014/0129306 | A1 * | 5/2014 | Rappoport | G06Q 30/0212 |
| | | | | 705/14.14 |
| 2014/0129313 | A1 * | 5/2014 | Rappoport | G06Q 30/0224 |
| | | | | 705/14.25 |
| 2014/0143058 | A1 * | 5/2014 | Lessin | G06Q 50/01 |
| | | | | 705/14.58 |
| 2014/0274135 | A1 * | 9/2014 | Edge | H04W 4/021 |
| | | | | 455/456.2 |
| 2014/0279539 | A1 * | 9/2014 | Rephlo | G06Q 20/405 |
| | | | | 705/44 |
| 2015/0019317 | A1 * | 1/2015 | Mitchell | G06Q 30/0226 |
| | | | | 705/14.27 |
| 2015/0120473 | A1 * | 4/2015 | Jung | G06Q 20/20 |
| | | | | 705/16 |
| 2015/0140954 | A1 * | 5/2015 | Maier | H04W 4/025 |
| | | | | 455/404.2 |
| 2015/0154641 | A1 * | 6/2015 | Weiss | G06Q 30/0267 |
| | | | | 455/456.3 |
| 2015/0161585 | A1 * | 6/2015 | Huster | G06Q 20/3224 |
| | | | | 705/44 |
| 2015/0199738 | A1 * | 7/2015 | Jung | G06Q 30/0609 |
| | | | | 705/26.35 |
| 2015/0242969 | A1 * | 8/2015 | Pallas | B67D 7/145 |
| | | | | 705/39 |
| 2015/0334545 | A1 * | 11/2015 | Maier | H04W 64/00 |
| | | | | 455/404.2 |
| 2016/0012465 | A1 * | 1/2016 | Sharp | G06Q 20/321 |
| | | | | 705/14.17 |
| 2016/0034961 | A1 * | 2/2016 | May | G06Q 30/0255 |
| | | | | 705/14.58 |
| 2016/0125384 | A1 * | 5/2016 | Lemberger | H04W 12/64 |
| | | | | 705/44 |
| 2016/0210623 | A1 * | 7/2016 | Voege | G06Q 20/322 |
| 2016/0244311 | A1 * | 8/2016 | Burks | B67D 1/0888 |
| 2016/0247149 | A1 * | 8/2016 | Postrel | G06Q 20/363 |
| 2016/0253651 | A1 * | 9/2016 | Park | G06Q 20/34 |
| | | | | 705/39 |
| 2016/0259775 | A1 * | 9/2016 | Gelfenbeyn | G06F 40/35 |
| 2016/0275558 | A1 * | 9/2016 | Tiku | G06Q 30/0261 |
| 2016/0364716 | A1 * | 12/2016 | Bakshi | G06Q 20/3224 |
| 2017/0098216 | A1 * | 4/2017 | Studnitzer | G06Q 40/02 |
| 2017/0098217 | A1 * | 4/2017 | Studnitzer | G06Q 40/03 |
| 2017/0178174 | A1 * | 6/2017 | Mitchell | G06Q 30/0226 |
| 2017/0193491 | A1 * | 7/2017 | Phipps | H04W 4/80 |
| 2017/0193530 | A1 * | 7/2017 | Newsum | G06Q 30/0281 |
| 2017/0221032 | A1 * | 8/2017 | Mazed | G06Q 20/321 |
| 2018/0075063 | A1 * | 3/2018 | Patel | G06F 16/9537 |
| 2018/0095995 | A1 * | 4/2018 | Patel | G06F 16/9537 |
| 2019/0325447 | A1 * | 10/2019 | Studnitzer | G06Q 20/4014 |
| 2019/0340192 | A1 * | 11/2019 | Patel | G06F 16/387 |
| 2020/0051117 | A1 * | 2/2020 | Mitchell | G06Q 30/0239 |
| 2020/0058014 | A1 * | 2/2020 | Phipps | G06Q 20/322 |
| 2020/0081976 | A1 * | 3/2020 | Gelfenbeyn | G06F 40/35 |

(56) References Cited

U.S. PATENT DOCUMENTS

| | | | |
|---|---|---|---|
| 2021/0201321 A1* | 7/2021 | Studnitzer | G06Q 20/383 |
| 2022/0147712 A1* | 5/2022 | Gelfenbeyn | G06F 40/279 |
| 2022/0253854 A1* | 8/2022 | Studnitzer | G06Q 40/02 |
| 2023/0041008 A1* | 2/2023 | Patel | G06F 16/9537 |

FOREIGN PATENT DOCUMENTS

| | | | | |
|---|---|---|---|---|
| JP | 2015216652 A * | 12/2015 | | G01C 21/00 |
| WO | WO-2008083105 A2 * | 7/2008 | | G06Q 20/10 |
| WO | WO-2009094433 A1 * | 7/2009 | | G06Q 20/02 |
| WO | WO-2010141456 A2 * | 12/2010 | | G06Q 20/20 |

OTHER PUBLICATIONS

• Chris Horton. "What is Proximity Based Marketing?". (Feb. 5, 2016). Retrieved online May 15, 2022. https://www.socialmediatoday.com/news/what-is-proximity-based-marketing/452353/ (Year: 2016).*
• Owais Qayum et al. "FenceBook a Geofencing based Advertisements Application Using Android." (Oct. 27, 2016). Retrieved online Mar. 8, 2023. https://pdfs.semanticscholar.org/4594/0d8bffac35f47da118709e9259b69e3626ed.pdf (Year: 2016).*
• TCS. "Location-Based Services: An End-to-End Perspective." (Feb. 2010). Retrieved online Mar. 8, 2023. https://cdn2.hubspot.net/hub/51409/file-14400282-pdf/docs/telecommunication-systems-whitepape-lbs-end-to-end-perspective-msb020910v5.pdf (Year: 2010).*
International Search Report and Written Opinion for Application No. PCT/IB2017/058178 dated Feb. 28, 2018, 16 pages.

* cited by examiner

GPS DETERMINED LOCATION BASED ACCESS TO LINKED INFORMATION AND DELIVERY THEREOF

CROSS-REFERENCE TO RELATED APPLICATIONS

This application claims benefit under 35 USC 119 (e) of U.S. provisional Application No. 62/436,266, filed Dec. 19, 2016, the entire content of which is incorporated herein by reference.

TECHNOLOGICAL FIELD

Embodiments of the invention relate, generally, to facilitating access to linked information, for example, to GPS or short-range wireless equipped devices, and in particular, to providing location-based and/or boundary based access to device-linked instruments and delivery thereof.

BACKGROUND

The applicant has discovered problems with current methods, systems, and apparatuses for facilitating location-based and/or boundary based access to device-linked instruments and delivery thereof. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods, apparatuses, and computer readable media for facilitating access to linked information, for example, to GPS or short-range wireless equipped devices and delivery thereof. In some embodiments, the systems may be configured for facilitating location-based and/or boundary based access to user or device linked information. Some embodiments provide for, more specifically, to a system, method, apparatus, and computer program product for providing an electronic communication comprising a transmittable instrument in response to receiving an indication of interaction between a primary device and a third-party device.

Other systems, methods, and features will be, or will become, apparent to one with skill in the art upon examination of the following figures and detailed description. It is intended that all such additional systems, methods, features to be included within this description, be within the scope of the disclosure, and be protected by the following claims.

BRIEF DESCRIPTION OF THE SEVERAL VIEWS OF THE DRAWINGS

Figure 1:
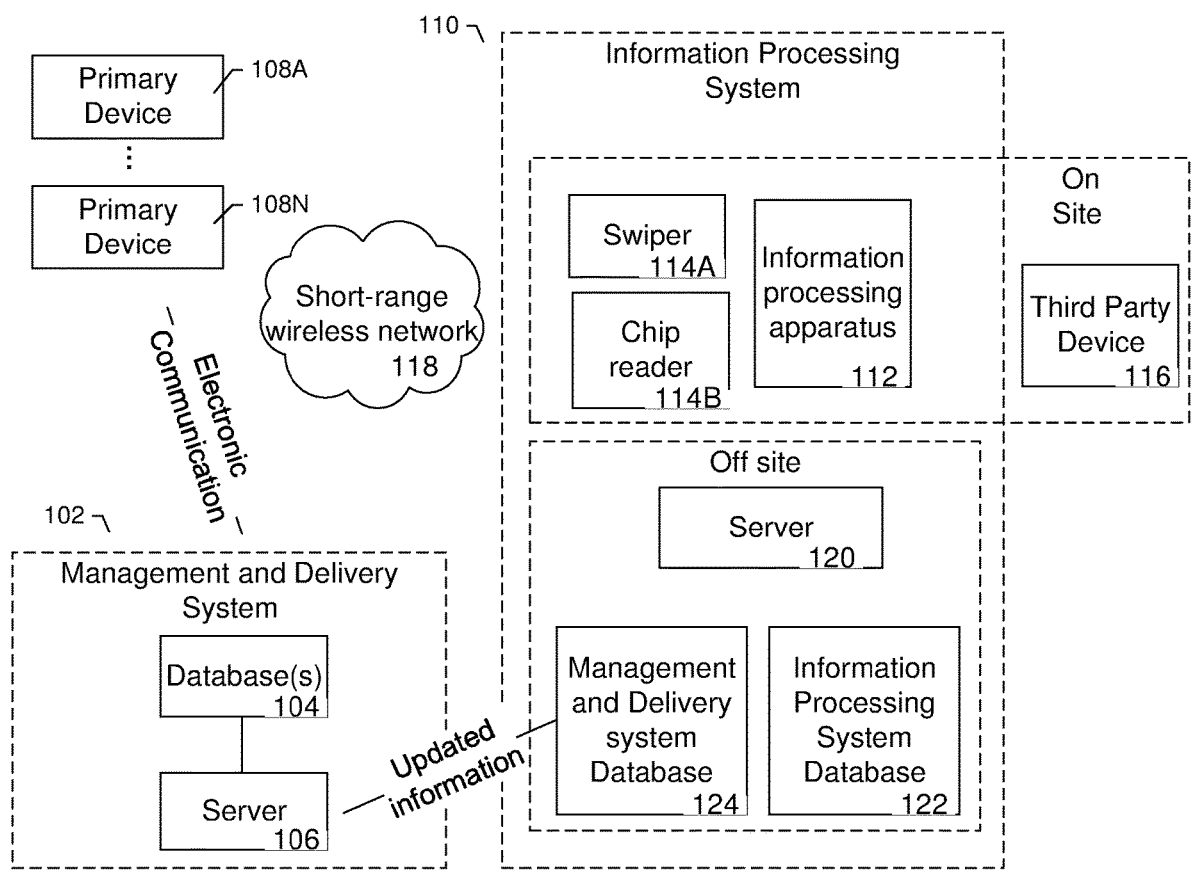

Having thus described embodiments of the invention in general terms, reference will now be made to the accompanying drawings, which are not necessarily drawn to scale, and wherein:

FIG. 1 shows an example system within which embodiments of the present invention may operate.

Figure 2:
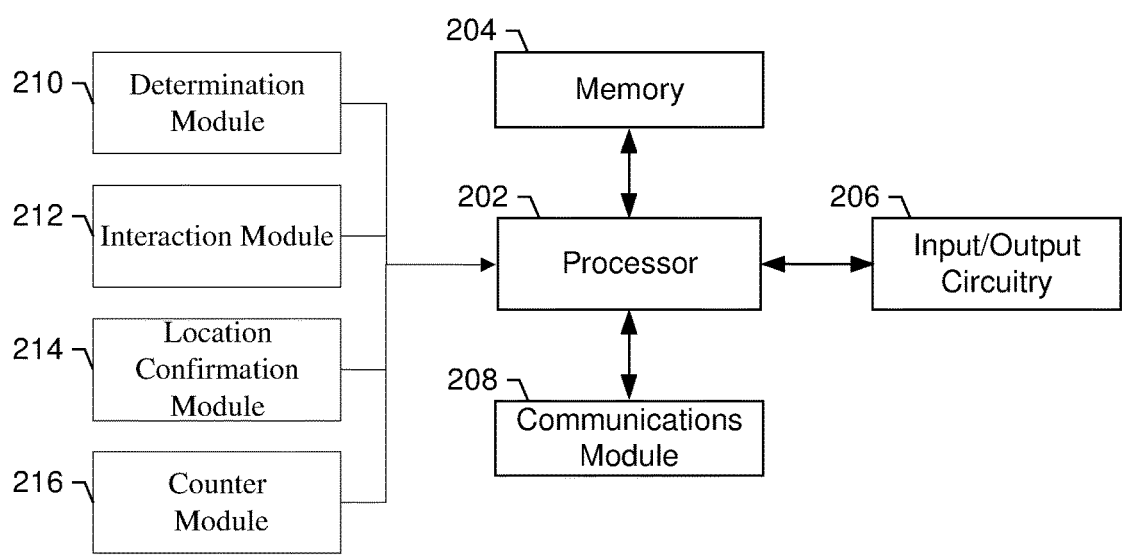

FIG. 2 shows a block diagram showing an example device for facilitating location-based and/or boundary based access to device-linked instruments and delivery thereof, using special-purpose circuitry in accordance with some exemplary embodiments of the present invention.

Figure 3:
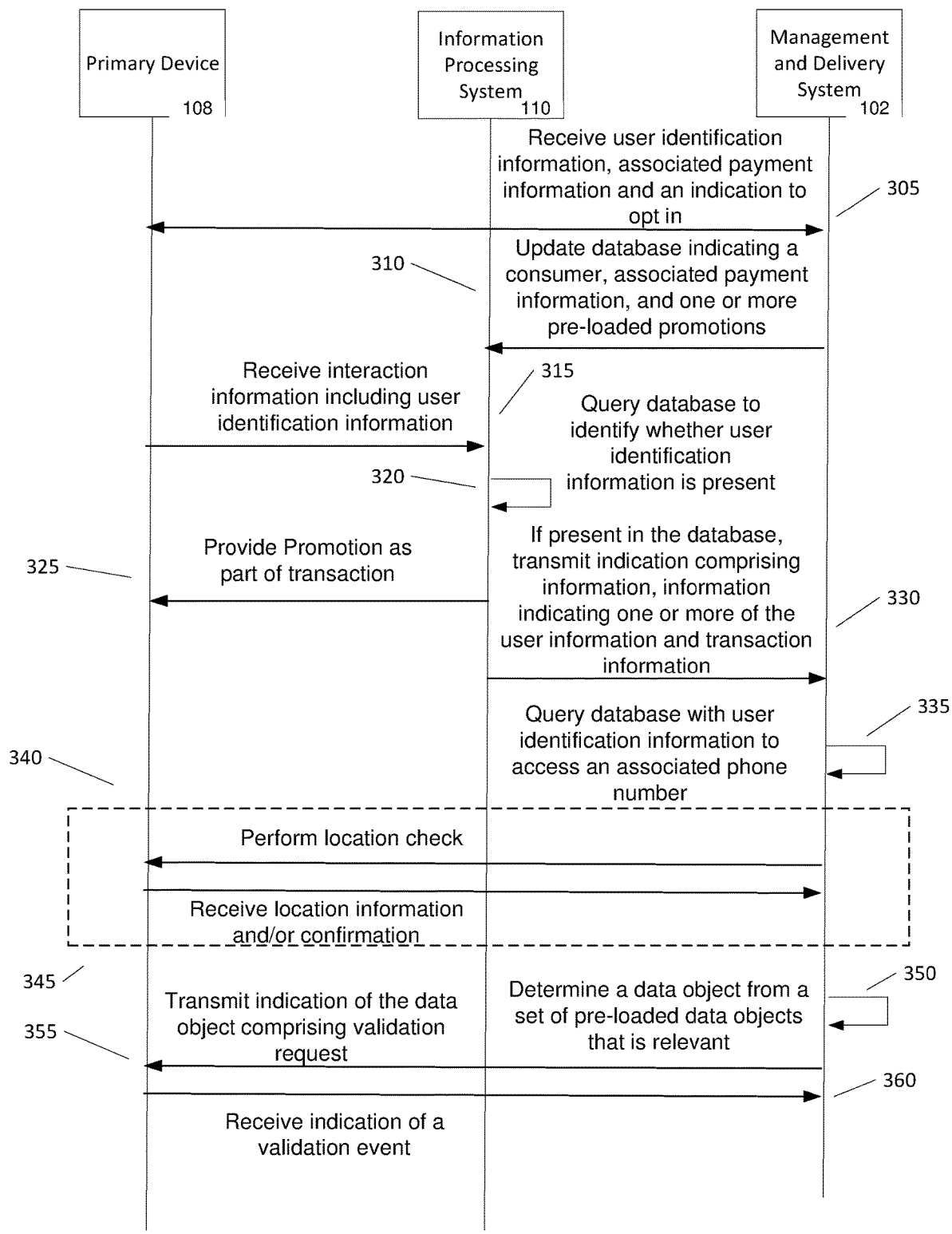

FIG. 3 shows a data flow diagram depicting data flow operations in accordance with some example embodiments discussed herein.

Figure 4:
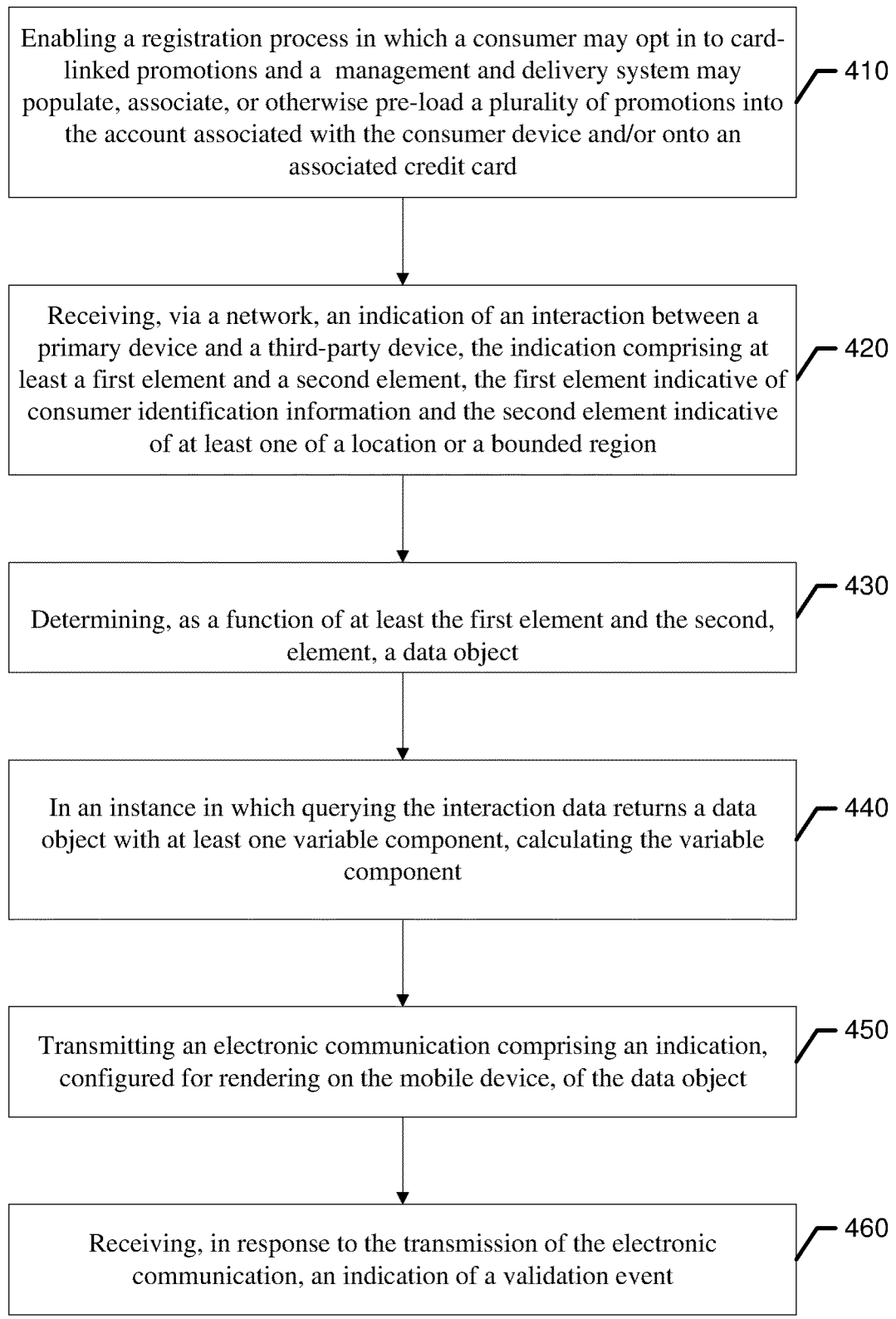

FIG. 4 shows a flowchart depicting example operations for location-based and/or boundary based access to device-linked promotions and delivery thereof, in accordance with some example embodiments discussed herein.

Figure 5A:
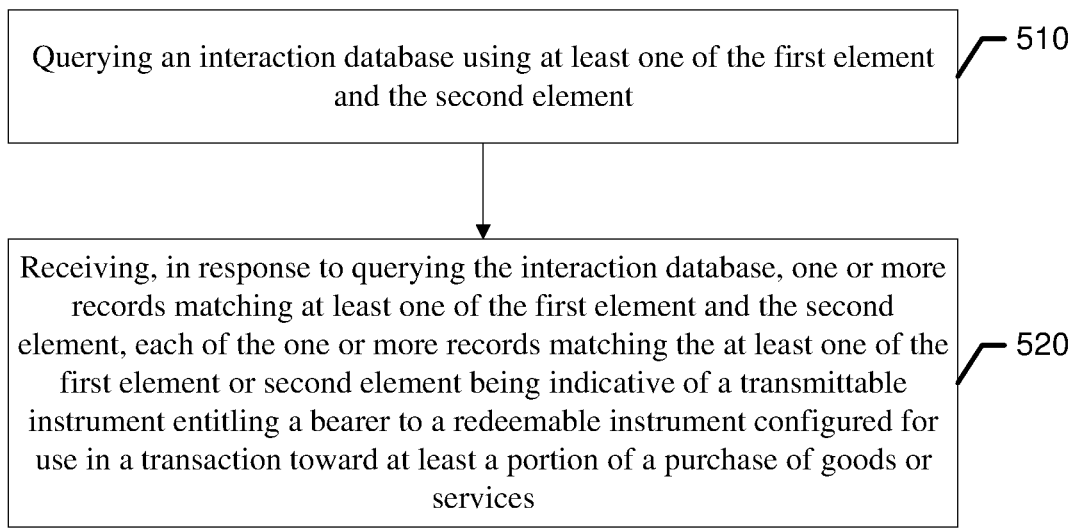
Figure 5B:
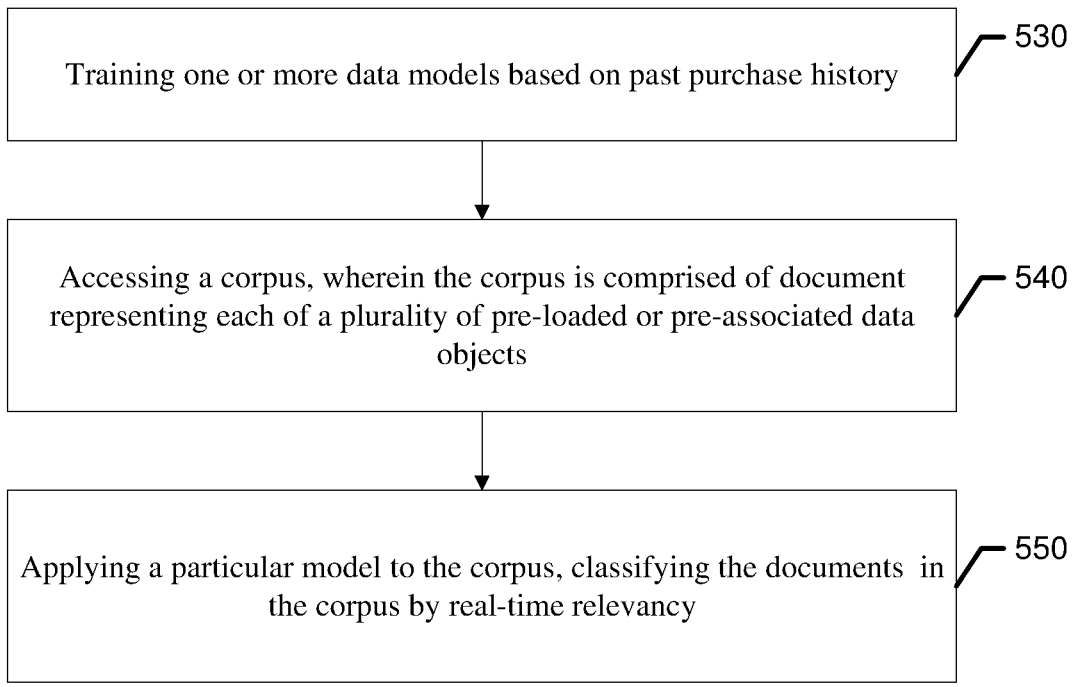

FIGS. 5A and 5B show flowcharts depicting exemplary embodiments of determining the one or more instruments to include in an electronic communication, in accordance with some embodiments of the present invention.

Figure 6A:
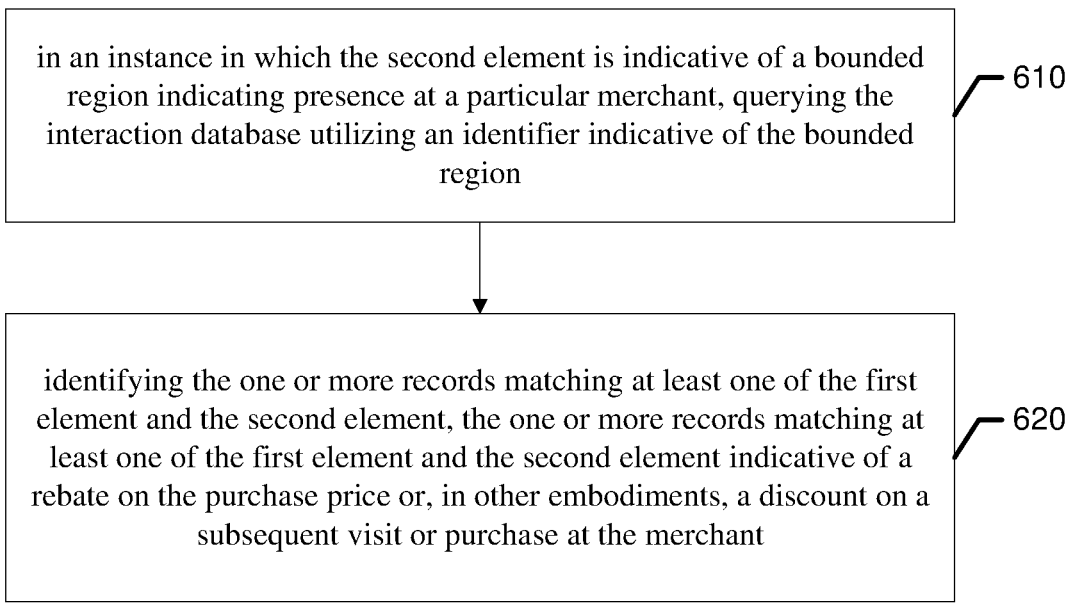
Figure 6B:
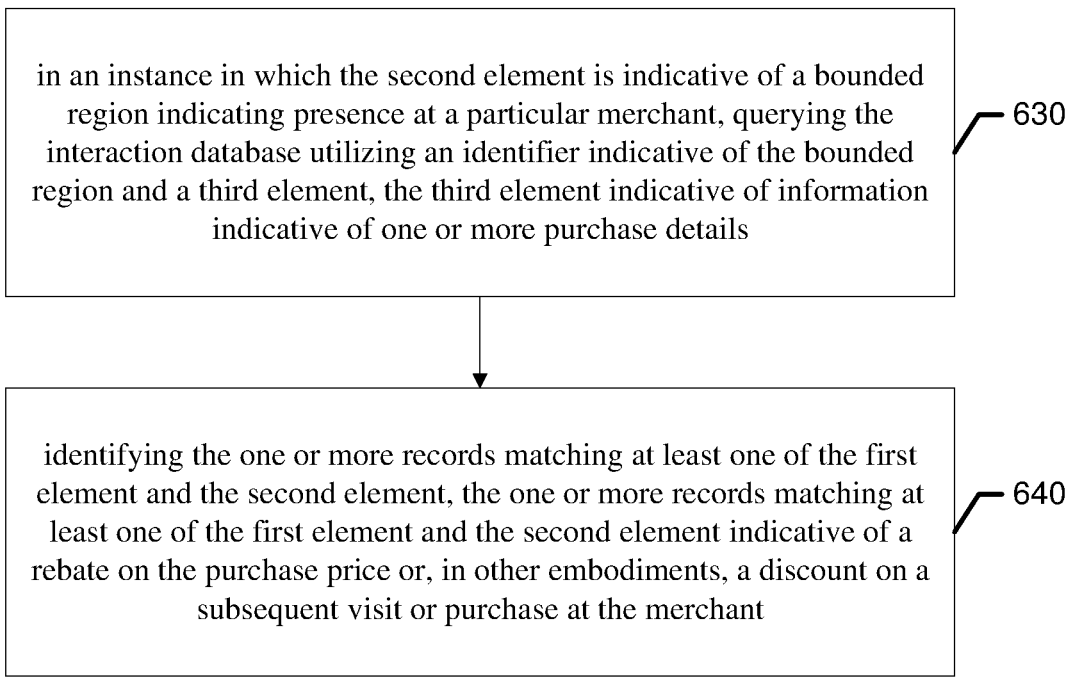
Figure 6C:
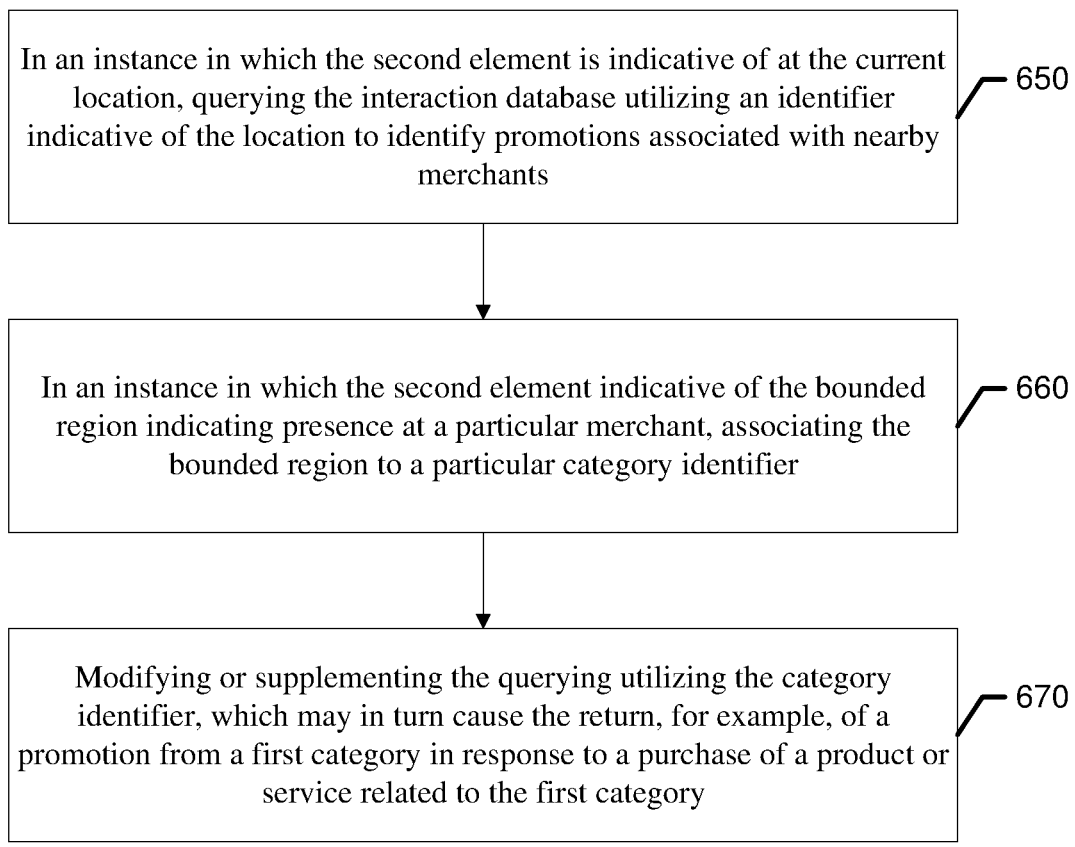

FIGS. 6A, 6B, and 6C show flowcharts depicting exemplary embodiments for providing various instruments in response to an indication of interaction, in accordance with some embodiments of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Various embodiments of the present invention are directed to improved systems, apparatuses, methods, and computer readable media for facilitating access to linked information, for example, to GPS or short-range wireless equipped devices. In particular, the various embodiments provide location-based and/or boundary based access to device-linked instruments and delivery thereof. In this regard, embodiments of the present invention provide systems, devices, methods, and computer readable media for receiving an indication of an interaction comprising location information from GPS or short-range wireless equipped devices and subsequently providing location-based and/or boundary-based linked promotions.

That is, a management and delivery apparatus, method, computer product, and system described herein are configured for, based on location information of a mobile device, delivering electronic communications comprising access to promotions to a the mobile device upon reception of an indication of an interaction between mobile device and a third party device.

For example, the primary device may be a credit card, and upon swiping (e.g., the interaction) at a payment processing device located at a merchant (e.g., the third-party device), a indication of that interaction is received at a management and delivery system. The management and delivery system is configured to utilize the location of the mobile device to make a determination of which instrument, from a set of instrument, to provide to the mobile device via an electronic communication.

In an exemplary embodiment, to make the determination, the management and delivery system may query a database for related or otherwise relevant promotions or rebates. That is, in this exemplary embodiment, upon in indication of a transaction, the management and delivery apparatus may transmit an electronic communication to a consumer device, the electronic communication comprising an indication of a rebate on a previous purchase, a discount on a future purchase, or a promotion for a related (e.g., by category and/or general location) merchant.

In other exemplary embodiments, the primary device may be the consumer device (e.g., a cellular phone equipped and/or configured with a payment application (e.g., Apple® Pay or the like) and the third party device is a mobile payment processing device. The interaction between the cellular phone and the payment processing device may be a transaction in which goods or services are purchased, and the indication of that interaction is sent to the management and delivery system. Upon reception of the indication of the transaction, the management and delivery apparatus may identify an available rebate to the merchant and subsequently transmit an electronic communication to the consumer device indicating the rebate on the previous purchase, and in some embodiments, additionally provide an instrument indicative of a discount on a future purchase, or a promotion for a related (e.g., by category or general location) merchant.

In some embodiments, the mobile device is configured to utilize location services to determine an absolute (or near absolute (i.e. within a few feet)) location for example, using GPS. Additionally or alternatively, in some embodiments, the mobile device is configured to utilize other short range wireless technologies (e.g., Bluetooth, ZigBee & Infrared Transmission) to determine an absolute location or a bounded region.

Upon reception of the indication of an interaction between the mobile device and, for example, a third party device such as a mobile payment processing system, a merchant device, a network access point, a location-service related device, or the like, the management and delivery apparatus may query an interaction database to retrieve one or more related or relevant records indicative of a transmittable instrument. That is, by receiving information indicative of the mobile device and a current location, either absolute or within a bounded region, the management and delivery apparatus may query the database to retrieve one or more records indicative of a transmittable instrument entitling a bearer to a redeemable instrument configured for use in a transaction toward at least a portion of a purchase of goods or services, for example, from a nearby merchant.

In any event, upon reception of an indication of an interaction between a mobile device and a third-party device, the management and delivery apparatus may determine or otherwise identify at least one of a plurality of instruments and subsequently transmit the instrument to the mobile device via an electronic communication. The instrument may be indicative of a rebate, a discount on a future purchase at a merchant, a promotion for a nearby merchant, or the like. And to determine the instrument, the management and delivery apparatus may utilize one or more elements included in the indication of the interaction. That is, the indication of the interaction may comprise any of a plurality of interaction details (e.g., consumer identification information, a location in the form of an indication of an absolute location or in the form of an indication of a bounded region). Other interaction details may include, for example, information indicative of the particular goods or services purchased and a purchase price. Any combination of the elements may be used to identify a particular model to apply to corpus of available instruments or, in other embodiments, to query an interaction database. Regardless of the method, the management and delivery apparatus determines at least one instrument from the set of instruments to make available to the mobile device. The management and delivery apparatus then transmits an electronic communication (e.g., a text message or the like) identifying the available instrument, for example, by including text information informing a user of a rebate, and/or by including at least one transmittable instrument entitling a bearer to a redeemable instrument configured for use in a transaction toward at least a portion of a purchase of goods or services.

Definitions

The term "primary device" as used herein describes a mobile device configured to interact with a third-party device. Examples of a primary device may include a laptop, mobile device (e.g., smartphones and other mobile devices), tablet, personal computer, a chip embedded card, credit card, debit card, key fob, or combination of any of the above, or the like. A primary device is able to interact with a third-party device in a number of different ways including wireless electronic communication, wired electronic communication, magnetic strip read, chip read, any processing of payment information resulting in detectable transaction, or the like.

A "third-party device" may be a device, a system of devices or a module operable to process or communicate in relation to a payment, such as a point-of-sale ("POS") machine, a mobile payment processing system, a cellular phone, a laptop, any intermediary device that could communicate with a POS machine, or the like. A third-party device may or may not communicate with a database in certain instances, such as in response to a consumer activity.

The term "interaction" as used herein refers to any type of communication between devices, including but not limited to, contactless payments, mobile payments, credit card payments (e.g., swipes), use of any positioning or location-based service, messaging (e.g., receiving or transmitting an electronic communication), connecting (i.e. via WIFI or a short-range wireless service), or the like.

Contactless payment type interactions may utilize contactless payment systems which may include one or more of credit cards and debit cards, key fobs, smart cards or other devices, including smartphones and other mobile devices, that use radio-frequency identification (RFID) or near field communication (NFC) for making secure payments by way of an embedded chip and antenna, for example, which enables consumers to wave their card, fob, or handheld device over a reader at the point of sale terminal.

The term "location" as used herein is the position of the user as determined by any one of well know positioning techniques including, but not limited to, use of GPS-based location based service which uses trilateration, cellular phone tower positioning where the location is determined based on the radio signal delay of the closest cell-phone towers, GSM localization, or any short-range technologies such as Bluetooth low energy, WLAN, infrared and/or RFID/Near field communication technologies, which are used to match mobile devices to nearby services, which is suitable for using inside closed premises, and/or identified a bounded region.

In some embodiments, a real-time location system may be utilized to identify and track the location of a mobile device in real time within a bounded regions (e.g., a building or other contained area) using one or more of radio frequency (RF) communication, optical (e.g., infrared), or acoustic (e.g., ultrasound) technology, and may in some embodiments, include speed, direction, or spatial orientation.

The term "bounded region" as used herein refers to an area identified by short-range technologies such as Bluetooth low energy, WLAN, infrared and/or RFID/Near field communication technologies.

As used herein, the term "merchant" may include, but is not limited to, a business owner, consigner, shopkeeper, tradesperson, vendor, provider, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "redemption" may include the use, exchange or other presentation of a voucher for at least a portion of a good, service or experience as defined by the redeemable instrument (e.g., a voucher) and its related offer. In some examples, redemption includes the verification of validity of the voucher. In other example embodiments, redemption may include an indication that a particular voucher has been redeemed and thus no longer retains an actual, promotional and/or residual value (e.g., full redemption). In other example embodiments, redemption may include the redemption of at least a portion of a voucher's actual, promotional and/or residual value (e.g., partial redemption). An example of redemption, using the aforementioned running company as the example provider, is exchanging a $50 voucher and $50 for a $100 pair of running shoes.

As used herein, the term "database" may refer to any organized collection of data. A database, as referred to herein, is organized such that information may be accessed via a query (e.g., the location of each of a plurality of consumers or merchants may be organized such that each consumer in a particular location may be queried).

Technical Underpinnings and Implementation of Exemplary Embodiments

Though the use of smart phones, chip-embedded cards, key fobs, and the like have become an integral and necessary part of people's personal and business operations, uses continue to grow.

While some solutions do exist (e.g., credit card rewards, mileage, points), several limitations preclude their mainstream use. For instance, none are utilized in real-time, nor do any provide any immediate feedback. As such, the use of such technologies is often a secondary consideration. Hence there exists a need for a simpler, real-time system, which can provide real-time benefits to the consumer.

System Architecture

FIG. 1 is a block diagram showing an exemplary system 100, which may include one or more devices and subsystems that are configured to implement embodiments discussed herein. For example, system 100 may include management and delivery system 102, which may include, for example, server 104 and at least interaction database 106 as well as, in some embodiments, other databases including by not limited to a historical database storing past purchase information or the like. Management and delivery system 102 may include any suitable network server and/or other type of processing device to communicate with a third party device and the interaction database 106 to facilitate the delivery of electronic messages, including for example, a transmittable instrument. The interaction database 106 may include any suitable network databases configured to store provider and consumer data, promotion data, transaction data, redemption data, and/or the like, such as that discussed herein. In this regard, management and delivery system 102 may include, for example, at least one backend data server, network database, cloud computing device, or the like, among other elements.

Primary device(s) 108A-108N may be implemented as a chip-embedded credit card, a cellular phone and/or other device capable of interacting with a third-party device and/or information processing system 110, such as a smart phone, personal computer, laptop computer, mobile device, chip embedded card (e.g., a credit card, debit card, etc.) or a key fob, that may be used for any suitable purpose in addition to interacting with a third-party device via wired or wireless electronic communication, chip-read, magnetic strip read, etc. In some embodiments, one or more of primary device(s) 108A-108N may comprise a device that interacts with a third-party device and another device that communicates with the management and delivery system 102. The indication of interaction may be transmitted directly from one or more of primary device(s) 108A-108N to management and delivery system 102 via a network, or transmitted indirectly via a server such as a server owned by an information processing system, such as a payment processing company, a credit card company, a device provided by the management and delivery system, or a third-party device implementing software (e.g., an API) provided by or supported by the management and delivery system 102.

An information processing system 110 may include, for example, one or more components at a first site (e.g., a merchant site) and one or more components at a second site (e.g., off-site). At the first site, the information processing system 110 may comprise an information processing apparatus 112 that may be configured to receive information from one or more information receiving devices (e.g., a swiper 114A configured to receive information via a card swipe and/or a chip reader 114B configured to receive information via a short range wireless network 118). The information processing apparatus 112 may be configured to be run in conjunction with or independently of a merchant device 116.

In some embodiments, no information received at the information processing apparatus 112 is shared with the merchant device 116.

The information processing system 110 may further comprise, at the second site, a server 120 and at least information processing system database 122 and a management and delivery system database 124. The information processing system database 122 may be configured to store information related to clients (e.g., client information) of the information processing system, whereas the management and delivery system database may be configured to store information related to clients of the management and delivery system 102. The server 120 may be further configured, in an instance in which an interaction (e.g., a transaction) occurs between a primary device 108A-108N and one of the swiper 114A or chip reader 114B, to communicate with, for example, a card issuing bank server 126, for example, to request and/or receive authorization to approve the transaction.

The server 120 may further be configured to access the management and delivery database to identify whether a client of the information processing system 110 is also a client of the management and delivery system 102. In an instance in which, for example, a query using client identification information returns a positive results, the server 120 may be configured to notify the management and delivery system. The management and delivery system 102 may be configured to provide updated information, for example, related to clients of the management and delivery system 102 or otherwise maintain the management and delivery system database.

The "third-party device" may be a device or number of devices or a module operable to process or communicate in relation to a payment, such as a point-of-sale ("POS") machine, a cellular phone, a laptop, any intermediary device that could communicate with a POS machine, or the like. A third-party device may or may not communicate with a database in certain instances, such as in response to a consumer activity.

Example Apparatus for Implementing Embodiments of the Present Invention

Server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, determination module 210, interaction module, 212, location confirmation module 214, and countdown module 216. The apparatus 200 may be configured to execute the operations described above with respect to FIG. 1 and below with respect to FIGS. 3, 4A, 4B, and 5A-5C. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Determination module 210 includes hardware configured to determine which one or more instruments to provide to a consumer device based on received information. Determination may be based on a classifying model machine learned using historical training data. The determination module 210 may utilize processing circuitry, such as the processor 202, to perform these actions. The determination module 210 may receive the data via a network interface provided by the communications circuitry 208. However, it should also be appreciated that, in some embodiments, the determination module 210 may include a separate processor, specially configured field programmable gate array (FPGA), or application specific interface circuit (ASIC) to perform the database migration and/or provide database migration framework. The determination module 210 is therefore implemented using hardware components of the apparatus configured by either hardware or software for implementing these planned functions.

Interaction module 212 includes hardware configured to receive and/extract a plurality of elements from an indication of interaction. That is, upon an interaction between primary device and a third-party device, an indication of the interaction is received at the management and delivery system. The interaction module 212 may be configured to process the indication. For example, the first element of the indication may be consumer identifying information may which may be explicitly identifiable, or may require decoding, correlating or otherwise associating consumer identification information to a consumer. The second element may be an absolute location or a bounded region, and the interaction module may be configured to identify which of the two it is and decode, correlate or otherwise associate the location or bounded region to a location (e.g., a state, city, or neighborhood) or a particular merchant, or the like. In those embodiments in which other elements are present in the indication, the interaction module 212 may be configured to identify those elements.

The interaction module 212 may utilize processing circuitry, such as the processor 202, to perform these actions. The interaction module 212 may receive the data via a network interface provided by the communications circuitry 208. However, it should also be appreciated that, in some embodiments, the interaction module 212 may include a separate processor, specially configured field programmable gate array (FPGA), or application specific interface circuit (ASIC) to perform the database migration and/or provide database migration framework. The interaction module 212 is therefore implemented using hardware components of the apparatus configured by either hardware or software for implementing these planned functions.

Location confirmation module 214 includes hardware configured to confirm the received location information. The location confirmation module 214 may utilize processing circuitry, such as the processor 202, to perform these actions. The location confirmation module 214 may receive the data via a network interface provided by the communications circuitry 208. However, it should also be appreciated that, in some embodiments, the location confirmation module 214 may include a separate processor, specially configured field programmable gate array (FPGA), or application specific interface circuit (ASIC) to perform the database migration and/or provide database migration framework. The location confirmation module 214 is therefore implemented using hardware components of the apparatus configured by either hardware or software for implementing these planned functions.

Countdown module 216 includes hardware configured to make a transmitted instrument available for a predefined time or in some embodiments, only for a time period in which the instrument is still relevant. That is, a promotion for dessert may only be kept available for a pre-defined amount of time (e.g., 1 hour) after an indication of an interaction at a restaurant. In other embodiments, in which a consumer device is moving at an identified pace in an identified direction, the countdown module 216 may be configured to keep a promotion available for a predefined period of time. The countdown module 216 may utilize processing circuitry, such as the processor 202, to perform these actions. The countdown module 216 may receive the data via a network interface provided by the communications circuitry 208. However, it should also be appreciated that, in some embodiments, the countdown module 216 may include a separate processor, specially configured field programmable gate array (FPGA), or application specific interface circuit (ASIC) to perform the database migration and/or provide database migration framework. The countdown module 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations for Implementing Embodiments of the Present Invention

In some embodiments, the system may be configured to provide location-based and/or boundary based access to device-linked promotions. FIG. 3 shows exemplary process for providing the location-based and/or boundary based access to device-linked promotions and delivery thereof. FIG. 3 shows an example method that may be executed by one or more machines, for example by apparatus 200, including determination module 210, interaction module 212, and location confirmation module 214 of FIG. 2, for providing the location-based and/or boundary based access to device-linked promotions and delivery thereof, in accordance with some embodiments discussed herein.

Providing Location-Based and/or Boundary Based Access to Device-Linked Instruments FIG. 3 shows a dataflow diagram of an example processing, which can result in providing, to a mobile device, an electronic communication comprising a claimable instrument, performed in accordance with some embodiments.

At 305, a registration process may be performed. Additionally or alternatively, an opt-in indication may be provided from the mobile device to the management and delivery system. The registration process enables, for example, a user to register a mobile device or otherwise associate themselves with a payment method, such as, for example, a credit card or mobile payment app. In some embodiments, the payment method may comprise a mobile device (e.g., a cellular phone or other mobile apparatus) and/or a primary device which may, in some embodiments, be the consumer device comprising a mobile payment application (Apple® Pay), token, or chip, or for example, a chip embedded card, key fob, or the like.

At 310, the management and delivery system may be configured to update a management and delivery system server maintained as part of the information processing system. For example, the management and delivery system may be configured to update a database with an entry to comprise consumer identification information, associated payment information, and one or more data objects indicative of pre-loaded promotions, discounts, deals, or the like. For example, in some embodiments, a database (e.g., the management and delivery system database) may be maintained for exclusive use by an information processing system (Visa®), enabling the information processing system to extract consumer identification information from an interaction with a merchant (e.g., a transaction or the like) and utilize the consumer identification information to determine if the user is a client of the management and delivery system without comprising the privacy (e.g., the identity) of every user who transacts with those merchants who have promotions populated, associated, or otherwise pre-loaded with particular consumers, who may be their clients (their clients being individual merchants who employ the information processing system to perform payment processing tasks). In short, the management and delivery system maintains the management and delivery system database for use by the information payment processing system—which includes adding identification information of new clients, and in some embodiments, one or more data objects indicative of pre-loaded promotions, discounts, deals, or the like.

At 315, the information processing system may be configured for receiving interaction information, comprising at least, for example, user identification information and, in some embodiments, payment information. In some embodiments, the interaction information may further comprise transaction details such as an indication of the goods or service purchased, a category of the goods or services purchase, and/or a purchase price of the goods or services purchased.

At 320, the information processing apparatus may be configured to extract or otherwise utilize the user identification information determine if the consumer identification information matches user identification information stored in the management and delivery system database to which the information processing system has access. In an instance in which it is determined that the consumer identification information from the interaction information matches the user identification information stored in the management and delivery system database, an indication of the interaction may be provided to the management and delivery system. Whereas, in the event that no match is found, the information processing apparatus may conclude that the user of the primary device is not a client of the delivery and management system, and as such, the consumer identification information is not shared. At 325, in an instance in which it is determined that the consumer identification information from the interaction information matches the user identification information stored in the management and delivery system database, the payment processing system may be configured to provide information facilitating the promotion, discount, deal or the like that has been populated or associated, or otherwise pre-loaded, for example, with the consumer identification information, the payment information.

At 330, the management and delivery system may be configured for receiving, via a network, an indication of the interaction between the primary device and a second device, such as an information processing apparatus. For example, an interaction may be transaction using Apple® Pay, Samsung® Pay, Google Wallet®, or the like and in this case, the management and delivery system may be configured to receive an indication of the interaction where a card reader may have read user identification information from the mobile device. In other embodiments, the interaction may be a transaction in which goods or services are purchased with a credit card, where, for example, a credit card swipe is the interaction, and in such an embodiment, the management and delivery system may be configured to receive an indication of the interaction where a swiper read user identification information from a credit card or a scanner read the user identification information from a chip housed in a chip-embedded card.

At 335, the delivery and management system may be configured to query, for example, a user database, registration database, or the like to determine a phone number associated with the user identification information.

In some embodiments, the delivery and management system may be configured to perform a location check. That is, while in some embodiments, interaction information may comprise location information indicative of an absolute location of a primary device or a bounded region, or in other embodiments, the information processing apparatus may provide location information, the delivery and management system may still perform a location determination and/or confirmation. As shown at 340, a transmission, such a location query or an indication requesting confirmation of a location, may be sent to the primary device, or in some embodiments, a mobile device associated with the primary device (as identified by the phone associated with the user identification information received in the indication of the interaction. At 345, in response to the transmission, a response may be received confirming the location or otherwise indicating the location or the bounded region in which the mobile device is located.

At 350, the management and delivery system may be configured to determine a particular instrument to which the user may find relevant. For example, the system may be configured to determine a particular promotion, for example, having real-time relevancy, and to transmit an indication such as a validation request or, for example, a claimable instrument identifying the promotion, to the mobile device.

As will described in more detail below, the real-time relevancy may be based on at least the absolute location of the mobile device or bounded region within which the mobile device is located, as well as, in some embodiments, past purchase history.

At 355, the management and delivery system may be configured to transmit an electronic communication comprising the indication of the validation request or the claimable instrument. In some embodiments, the indication of the validation request or claimable instrument that may be included in the electronic communication may include text indicative of, for example, a reward (e.g., Here is $5 back for visiting "Merchant A"), a rebate (e.g., You received $5 off your purchase a "Merchant A", thank you for being a loyal customer)), a promotion for a subsequent visit to the same merchant ((e.g., Thank you for visiting "Merchant A", please enjoy $5 your next purchase), an advertisement for a different (but related relevant) merchant (e.g., Thank you for visiting "Merchant A", there is a great ice cream store near-by—check them out), or a promotion for a different (but related and/or relevant) merchant (e.g., Thank you for visiting "Merchant A", there is a great ice cream store near-by—enjoy $5 off at the ice cream store for the next 30 minutes).

At 360, the management and delivery system may be configured to receive a second electronic communication indicative of a validation of the validation request or, in some embodiments, claiming the claimable instrument.

FIG. 4 illustrates a flowchart of exemplary operations for a process 400 that may be executed by one or more apparatuses, for example, the management and delivery system server, to receive an indication of an interaction, query an interaction data, and transmit an electronic communication comprising a transmittable instrument, in accordance with some embodiments. As shown in block 410 of FIG. 4, an apparatus, such as apparatus 200, may be configured for enabling a registration process. The registration process allows a consumer to register or otherwise associate themselves with a payment method, such as, for example, a credit card or mobile payment app. That is, the payment method may comprise a consumer device (e.g., a cellular phone or other mobile apparatus) and/or a primary device (which may be the consumer device, for example) comprising a mobile payment application (Apple® Pay) or a credit card, online payments system, or the like.

During the registration process, the management and delivery system may utilize a relevance engine or the like to populate, associate, or otherwise pre-load a plurality of promotions into the account associated with the consumer device and/or onto the credit card. In addition to pre-loading one or more promotions that a consumer explicitly identifies and/or requests, the management and delivery system may be configured to identify other relevant promotions for inclusion. In some embodiments, the management and delivery system may be configured to populate, associate, or otherwise pre-load every available promotion with the consumer device and/or onto the credit card. In other embodiments, the management and delivery system may be configured to populate, associate, or otherwise pre-load every available promotion within a particular area (e.g., within a pre-defined radius of a geographic location associated with the consumer device and/or user account, within the same city, neighborhood, or the like, etc.) with the consumer device and/or onto the credit card.

In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference in its entirety, algorithms are provided for matching consumers to relevant promotions. In particular, the registration process may allow the consumer to search for particular merchants, categories, and/or location that may be of interest. As such, the management and delivery system may be configured such that particular promotions may be offered to consumers based on relevance determinations. For example, U.S. patent application Ser. No. 13/829,581, which is entitled "Promotion Offering System", was filed Mar. 14, 2013, and which is hereby incorporated by reference in its entirety, provides various processes and algorithms for providing consumers relevant promotions in response to consumer action.

Relevance may be determined based on information related to promotions that the consumer explicitly selects or searches for, promotions determined to be relevant based on past purchase history, promotions determined to be relevant for any other reasons (e.g., explicitly indicated preferences and profile information, social network statuses and check-ins, searches, click-throughs on displayed ads, etc.).

Reception

As shown in block 420 of FIG. 4, an apparatus, such as apparatus 200, may be configured for receiving, via a network, an indication of an interaction between a primary device and a third-party device. For example, an interaction may be transaction using Apple® Pay, Samsung® Pay, Google Wallet®, or the like. In other embodiments, the interaction may be a transaction in which goods or services are purchased with a credit card, where, for example, a credit card swipe is the interaction. Other exemplary embodiments may include but are not limited to a phone-processed payment, any processing of payment information resulting in detectable transaction, or the like. Specific examples are described below.

Regardless of whether the interaction is a transaction, location service based, or the like, the indication may comprise at least a first element and a second element. The first element may be indicative of consumer identification information. In some exemplary embodiments, the consumer identification information may be transmitted as the first element (i.e. explicitly identifying a particular consumer), while in other embodiments, encoded information may be transmitted as the first element, and the system may decode or otherwise correlate the encoded information to consumer identification information or the consumer.

The second element may be indicative of at least one of a location or a bounded region (e.g., a boundary of a location), or the like. For example, the second element may identify an absolute location, via a location service utilizing GPS or the like, connection to a particular WIFI network, or the like. In other embodiments, the second element may be an indication of a bounded region, for example, acquired via location services utilizing any of a plurality of geo-fencing techniques (i.e. short-range wireless services). In some embodiments, the system may associate, correlate, or otherwise identify an indication of a particular bounded region to a particular merchant. In some embodiments, the system may be configured for utilizing or otherwise providing location service API to confirm the location.

In some embodiments, other elements may be included such as, for example, a name of one or more of the merchants in the region, general product information of the merchants, specific product information related to the interaction or transaction, pre-categorized merchant category information of merchant in the region, merchant operating capacity information, merchant remaining operating capacity information, transactional history information, or the like. The consumer identification information may be any information that could be used to identify a specific consumer or a category of consumers. For example, in some embodiments, consumer identification information may be personal information of a consumer such as name, age, address, occupation, gender, etc., identification number unique to a specific consumer, identification number for a group of customers, pre-categorized consumer category information, etc.

Example use cases include embodiments in which (1) primary device is the consumer device, the third party device is payment processing device or a merchant payment system located at, for example, a merchant, and the interaction is purchase of goods or services from the merchant and (2) the primary device is a credit card, the third party device is payment processing device located at, for example, a merchant, and the interaction is purchase of goods or services from the merchant, (3) the primary device is the consumer device, the third party device is a merchant payment system, and the interaction is a proximity or check in, (4) the primary device is the consumer device, the third party device is a location service apparatus (e.g., making short range wireless connection to consumer device via WIFI, Bluetooth, etc.), or access point to a WIFI network, or the like and the interaction is a connection to the merchant network, or (5) the primary device is the consumer device, the third party device is a satellite system (e.g., GPS), and the interaction is use of location services and determination of a current location utilizing GPS signals on the consumer device.

Determination

Once the indication of the interaction is received, the system may be configured to determine a particular instrument to include in a subsequent electronic communication. For example, the system may be configured to determine a particular promotion, for example, having real-time relevancy, and to transmit an indication (e.g., a claimable instrument identifying the promotion) to the consumer device. The real-time relevancy may be based on at least location (e.g., proximity), and in some embodiments, past purchase history. As such, the system may be configured to utilize the elements (e.g., the first element and second element described above) to identify a particular instrument to transmit to the consumer device.

The instrument that may be included in the electronic communication may be a reward (e.g., Here is $5 back for visiting "Merchant A"), a rebate (e.g., You received $5 off your purchase a "Merchant A", thank you for being a loyal customer)), a promotion for a subsequent visit to the same merchant ((e.g., Thank you for visiting "Merchant A", please enjoy $5 your next purchase), an advertisement for a different (but related relevant) merchant (e.g., Thank you for visiting "Merchant A", there is a great ice cream store near-by—check them out), or a promotion for a different (but related and/or relevant) merchant (e.g., Thank you for visiting "Merchant A", there is a great ice cream store near-by—enjoy $5 off at the ice cream store for the next 30 minutes).

As such, as shown in block 430 of FIG. 4, an apparatus, such as apparatus 200, may be configured for determining, as a function of at least the first element and the second element, a transmittable instrument entitling a bearer to a redeemable instrument configured for use in a subsequent interaction.

In some embodiments, the determination of the instrument may be done by querying a set of pre-loaded promotions. In particular, as shown in block 410 of FIG. 4A, an apparatus, such as apparatus 200, may be configured for querying an interaction database to identify, for example, a record matching the first element and, in some embodiments, related to the second element. That is, the system may be configured to query the interaction database using at least one of the first element and the second element. In particular, interaction database may be queried using the consumer identification information and/or location information.

In some embodiments, the element indicative of consumer identification information and/or location or a bounded region may be used to find records in the interaction database that have been pre-loaded or pre-associated with the consumer or consumer identification information. The records may match the consumer identification information, and in some embodiments, match or be related or relevant to the second element. The match may be a complete match or an incomplete match. For example, in some embodiments, a complete match may be found where part of the record in the interaction database exactly matches the information used in querying, such as a promotion pre-loaded or pre-associated with the consumer identification information for use at the same location (e.g., the same merchant) with which the consumer just had the interaction. In some embodiments, an incomplete match may be found in an instance in which a promotion is pre-loaded or pre-associated with the consumer identification information and, instead of being associated with the same location, is instead associated with a nearby location. When no specific part of the record in the interaction database would exactly matches the information used in querying, those records determined to match in part may be subject to further analysis, for example, by the interaction database or another server.

In some embodiments, the system may selectively exclude some matching records, for example, based on merchant information, consumer information, or any other information stored on the interaction database or another database that the interaction database has access to. For example, a consumer may, for example, during the registration step, request to exclude promotions from pre-defined merchant, those merchants failing to meet a pre-defined quality or rating threshold, and/or merchants associated with a particular category, sub-category, etc.

Once the querying is completed, as shown in block 420 of FIG. 4A, an apparatus, such as apparatus 200, may be configured for receiving, in response to querying the interaction database, one or more records matching at least one of the first element and the second element. In some embodiments, each of the one or more records matching the at least one of the first element or second element may be indicative of a transmittable instrument entitling a bearer to a redeemable instrument configured for use in a transaction toward at least a portion of a purchase of goods or services.

In an instance in which more than one promotion is returned, a relevancy analysis may be performed.

Variable Components

Returning now to FIG. 4, in some embodiments, the instrument may have variable components. For example, depending on the time of day, the nature of the interaction (e.g., dollar amount of the transaction), a rebate may change (e.g., $5 rebate for $50 purchase or $15 for $100). In another exemplary embodiment, the components of a promotion may be variable as a function of how busy a merchant is (e.g., $15 off $50 purchase when merchant is at 50% capacity or $10 off $50 at 75% capacity). In some embodiments, the availability of the instrument itself is a variable component. Accordingly, as shown in block 440 of FIG. 4, an apparatus, such as apparatus 200, may be configured for, in an instance in which a determination (e.g., querying the interaction database returns a transmittable instrument) is made, and the transmittable instrument comprises a variable component, calculating the variable component. That is, in some embodiments, the system may be configured to determine and/or modify promotions or components of the promotion. In an instance in which the modifying of a promotion is performed as a function of the capacity and/or business of the merchant, the calculation may be performed by determining a current capacity of the merchant (i.e. by, for example, determining an amount of promotions being redeemed at a particular merchant, which may inform the system as to how busy the merchant is.)

Merchants typically offer promotions (e.g., in the form of discounts, deals, rewards or the like) to consumers to generate more business. When offering a promotion, a merchant may seek to focus the offer to a specific subset of consumers that may have a higher likelihood of accepting the offered promotion and as such, the system may be configured for dynamically analyzing consumer feedback to offers for promotions Further description regarding dynamic deal optimization may be found in U.S. application Ser. No. 13/839,360, filed on Jun. 30, 2015, entitled "DYNAMIC PROMOTION ANALYTICS", which is hereby incorporated by reference.

Dynamic change of an adjustable component of a data set may be facilitated using an iterative learning model. Further description regarding dynamic pricing may be found in U.S. application Ser. No. 14/755,742,360, filed on Mar. 15, 2013, entitled "METHOD, APPARATUS, AND COMPUTER PROGRAM PRODUCT FOR FACILITATING DYNAMIC CHANGE OF AN ADJUSTABLE COMPONENT OF A DATA SET", which is hereby incorporated by reference.

Transmission

As shown in block 450 of FIG. 4, an apparatus, such as apparatus 200, may be configured for transmitting, to the consumer device, an electronic communication comprising at least one transmittable instrument.

In some embodiments, the delivery system may transmit one or more transmittable instruments to at least a particular application of the consumer device or, in other embodiments, via SMS (e.g., a text message). That is, during the registration process, the consumer may provide a phone number and authorization to communicate via SMS, and accordingly, the system may provide the electronic communication via text message.

In other embodiments, the system may be configured to provide the electronic communication via a particular application (e.g., an application provided by the system). In some embodiments, the particular application that receives the instrument may not be the same application that interacts with a third-party device. For example, in some embodiments, the application of consumer device that interacts with a third-party device is payment-related application. However, in some embodiments, the same application may serve as both a payment application comprising, for example credit card information (e.g., a digital wallet) and one or more claimable and/or redeemable instruments.

The transmittable instrument provided by the system entitles a bearer to a redeemable instrument configured for use in a transaction toward at least a portion of a purchase of goods or services. In some embodiments, the transmittable instrument may further comprise additional text or message information (e.g., a thank you note or the like) or any other type of information that does not entitle the bearer to a redeemable instrument configured for use in a transaction.

As shown in block 460 of FIG. 4, an apparatus, such as apparatus 200, may be configured for receiving an electronic message (e.g., a text message) to claim the claimable instrument. For example, in response to transmitting the transmittable instrument, wherein the transmittable instrument entitles a bearer to a redeemable instrument configured for use in a transaction toward at least a portion of a purchase of goods or services, the system may receive an indication claiming the redeemable instrument. That is, in response to receiving the electronic message comprising the transmittable instrument, the consumer device may be configured to provide a message or any other indication claiming the redeemable instrument.

Determination Processes

FIGS. 5A and 5B show flowcharts describing various processes for determine a particular instrument to include in an electronic communication. For example, the system may be configured to determine a particular promotion, for example, having real-time relevancy. FIG. 5A was described above and is a flowchart describing one method for determining the particular instrument to include in the electronic communication based on querying the interaction database utilizing the first and second element. FIG. 5B shows a flowchart disclosing a machine learning process for making the determination.

In some embodiments, determination may be performed, for example, by machine learning. In particular, as shown in block 510 of FIG. 5A, an apparatus, such as apparatus 200, may be configured for training one or more data models based on past purchase history. Subsequently, as shown in block 520 of FIG. 5A, an apparatus, such as apparatus 200, may be configured for accessing a corpus, wherein the corpus is comprised of document representing each of a plurality of pre-loaded or pre-associated instruments (e.g., rebates, coupons, promotions, deals, etc.). The system may then apply a particular model to the corpus, for example, depending on the consumer identification information or the like, classifying the documents in the corpus by real-time relevancy. As such, as shown in block 530 of FIG. 5A, an apparatus, such as apparatus 200, may be configured for applying a particular model to the corpus. That is, the documents in the corpus may be classified by their immediate, near immediate, or real-time relevancy (i.e. determining whether each promotion is relevant right now based on the consumer's current location and the interaction). Training data for each of the plurality of classifiers may comprise past purchase history of the consumer or, in some embodiments, similar consumers (e.g., those sharing particular attributes such as age, gender, location, etc.)

Once a model has been derived from an initial training data set, the system may be configured to monitor performance of the model and update the training data set so that the model may be adapted incrementally to changes in the behavior of the user. Incremental adaptation of a model reduces the costs involved in repeatedly replacing the model.

In other embodiments, determination may be performed by a relevancy analysis. That is, given the indication, including the first element and the second element, the system may be configured to identify which of the preloaded or pre-associated instruments is most relevant to the consumer at that moment.

Exemplary Embodiments

The following exemplary embodiments show exemplary embodiments for the process described above with reference to FIGS. 1 and 2. FIGS. 6A, 6B, and 6C show exemplary embodiments that may be provided, generated, or otherwise utilized, in accordance with embodiments of the present invention, for example, to provide various instruments in response to an indication of interaction.

As shown in block 610 of FIG. 6A, an apparatus, such as apparatus 200, may be configured for, in an instance in which the second element is indicative of a bounded region or the boundary of a location, for example, indicating that the consumer is at a particular merchant, querying the interaction database utilizing an identifier indicative of the bounded region. In some embodiments, the querying may also utilize a third element, the third element indicative of information indicative of one or more purchase details (e.g., product or service identification information and/or a purchase price). In some embodiments, as shown in block 620 of FIG. 6A, an apparatus, such as apparatus 200, may be configured to then identify the one or more records matching at least one of the first element and the second element, the one or more records matching at least one of the first element and the second element indicative of a rebate on the purchase price or, in other embodiments, a discount on a subsequent visit or purchase at the merchant.

As shown in block 630 of FIG. 6B, an apparatus, such as apparatus 200, may be configured for, in an instance in which the second element indicative of the bounded region, querying the interaction database utilizing an identifier indicative of the bounded region and a third element, the third element indicative of one or more purchase details (e.g., product or service identification information and/or a purchase price). In some embodiments, as shown in block 640 of FIG. 6B, an apparatus, such as apparatus 200, may be configured to then identify the one or more records matching at least one of the first element and the second element, and in some embodiments, a category associated with third element, the one or more records matching at least one of the first element and the second element indicative of a related promotion, for example, the related promotion being relevant to the transaction. For example, the related promotion may comprise a discount on ice cream at an ice cream shop after dinner at a restaurant.

As shown in block 650 of FIG. 6C, an apparatus, such as apparatus 200, may be configured for, in an instance in which the second element is indicative of at the current location (e.g., via GPS), querying the interaction database utilizing an identifier indicative of the location to identify promotions associated with nearby merchants.

As shown in block 660 of FIG. 6C, an apparatus, such as apparatus 200, may be configured for, in an instance in which the second element indicative of the bounded region indicating presence at a particular merchant, associating the bounded region to a particular category identifier. In some embodiments, as shown in block 670 of FIG. 6C, an apparatus, such as apparatus 200, may be configured for then modifying or supplementing the querying utilizing the category identifier, which may in turn cause the return, for example, of a promotion from a first category (e.g., food and drink promotion) in response to a purchase of a product or service related to the first category (e.g., a food and drink purchase).

FIGS. 3, 4, 5A, 5B, 6A, 6B, and 6C illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

For example, in reference to FIG. 4, one or more of the procedures described herein may be embodied by computer program instructions. In this regard, the computer program instructions which embody the procedures described above may be stored by a memory 204 of an apparatus employing an embodiment of the present invention and executed by a processor 202 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3, 4, 5A, 5B, 6A, 6B, and 6C when executed, convert a computer or processing circuitry into a particular machine configured to perform an example embodiment of the present invention. Accordingly, the operations of FIGS. 3, 4, 5A, 5B, 6A, 6B, and 6C define an algorithm for configuring a computer or processing to perform an example embodiment. In some cases, a general purpose computer may be provided with an instance of the processor which performs the algorithms of FIGS. 3, 4, 5A, 5B, 6A, 6B, and 6C to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
receiving, via a network, from payment processing device, an indication of an electronic interaction between a primary device and a third-party device, the electronic interaction being a purchase transaction of products or services presently being transacted at the third-party device, and the indication comprising at least a first element and a second element, the first element indicative of user identification information as provided by the primary device during the electronic interaction and the second element indicative of payment information, the primary device being a credit card comprising a chip or magnetic strip;
determining a phone number of a mobile device associated with user identification information provided in the indication of the electronic interaction;
performing a location query of the mobile device, wherein the location query comprises transmitting a first location to the mobile device;
receiving, via the network, from the mobile device responsive to the location query, an indication of at least one of a location or a bounded region;
determining, as a function of at least the first element and the location or the bounded region, a data object that upon validation is configured for use during a subsequent interaction between the primary device and a different third-party device by:
receiving, from the primary device, a series of queries comprising a current location of the mobile device;
determining a direction based at least in part on the series of queries, each of the series of queries comprising the current location at a time of reception;
determining, based at least in part on the series of queries and the current location of each at the time of reception, whether one or more of the determined direction or the series of queries is indicative of an outing or an errand;
querying an interaction database with the current location associated with a most recent query, and at least one of the determined direction, a time associated with the most recent query, or the indication of whether the series of queries or the direction is indicative of the errand or the outing; and
receiving, responsive to the querying, the data object, the data object indicative of a promotion; and
transmitting, to the mobile device, an electronic communication comprising an indication, configured for rendering on the mobile device, of the data object.

2. The method of claim 1, further comprising:
receiving, via the network, responsive to transmitting the electronic communication, an indication of a validation event.

3. The method of claim 2, wherein the reception of the indication of the validation event comprises:
receiving a second electronic communication claiming the data object.

4. The method of claim 1,
wherein the determining of the data object as the function of the at least the first element and the location or the bounded region further comprises:
querying the interaction database using at least one of the first element and the second element; and
receiving, responsive to querying the interaction database, one or more records matching at least one of the first element and the second element, each of the one or more records matching the at least one of the first element or the second element, and being indicative of the data object,
wherein the data object is an indication of a transmittable instrument configured for transmission to the mobile device and being rendered at the mobile device, and entitling a bearer, upon validation, to a redeemable instrument configured for use in the subsequent interaction.

5. The method of claim 1, wherein the determining of the data object as the function of the at least the first element and the location or the bounded region further comprises:
accessing a corpus, wherein the corpus is comprised of one or more documents, each of the one or more documents representative of a pre-loaded or pre-associated data objects; and
applying a particular machine-learning model to the corpus, classifying the one or more documents in the corpus by real-time relevancy.

6. The method of claim 1,
wherein the subsequent interaction is a transaction and the promotion comprises a redeemable instrument is configured for use toward at least a portion of a purchase of goods or services.

7. The method of claim 1, further comprising:
querying the interaction database utilizing an identifier indicative of the bounded region and a third element, the third element indicative of transaction information; and
identifying one or more records matching at least one of the first element and the location or the bounded region, the one or more records matching at least one of the first element and the second element indicative of a rebate or a discount on a subsequent visit.

8. The method of claim 1, further comprising:
querying the interaction database utilizing an identifier indicative of the bounded region and a third element, the third element indicative of transaction information; and
identifying one or more records matching at least one of the first element and the second element, the one or more records matching at least one of the first element and the second element indicative of a related promotion.

9. The method of claim 8, further comprising:
associating the bounded region to a particular category identifier, and wherein the querying further utilizes the particular category identifier.

10. The method of claim 1, further comprising:
querying the interaction database utilizing an identifier indicative of the current location to identify one or more transmittable instruments associated with one or more nearby merchants.

11. The method of claim 1, further comprising:
enabling a registration process, the registration process comprising one or more of receiving opt-in information, receiving registration of a payment method with an account, correlating the payment method with a user, receiving or identifying the phone number.

12. The method of claim 1, further comprising:
in an instance in which querying the interaction database returns at least one data object indication of a transmittable instrument with variable component, calculating the variable component.

13. The method of claim 1, further comprising:
responsive to transmitting the electronic communication comprising the data object, and wherein the data object is indicative of at least one transmittable instrument, providing an availability of the at least one transmittable instrument until a total amount of claims associated with the at least one transmittable instrument is reached.

14. The method of claim 1, wherein the current location is a GPS location.

15. The method of claim 1, further comprising:
responsive to transmitting the electronic communication comprising the data object and wherein the data object is indicative of at least one transmittable instrument, providing an availability of the at least one transmittable instrument for a predetermined time.

16. The method of claim 1, further comprising:
monitoring movement of the primary device utilizing one or more of a series of received response to the querying, each of the received responses identifying a GPS location of the primary device; and
responsive to the movement, modifying an inventory of the interaction database with a set of pre-loaded promotions based at least in part on associating the GPS location with one or more nearby third-party devices.

17. The method of claim 16, further comprising:
prior to modifying the inventory of the interaction database, accessing a promotion database to determine an availability of a relevant promotion; and
responsive to determining the availability of the relevant promotion, loading the relevant promotion.

18. An apparatus comprising at least one processor and at least one memory including computer program code, the at least one memory and the computer program code configured to, with the at least one processor, cause the apparatus to at least:
receive, via a network, from payment processing device, an indication of an electronic interaction between a primary device and a third-party device, the electronic interaction being a purchase transaction of products or services presently being transacted at the third-party device, and the indication comprising at least a first element and a second element, the first element indicative of user identification information as provided by the primary device during the electronic interaction and the second element indicative of payment information, the primary device being a credit card comprising a chip or magnetic strip;
determine a phone number of a mobile device associated with user identification information provided in the indication of the electronic interaction;
perform a location query of the mobile device, wherein the location query comprises causing the apparatus to transmit a first location to the mobile device;
receive, via the network, from the mobile device responsive to the location query, an indication of at least one of a location or a bounded region;
determine, as a function of at least the first element and the location or the bounded region, a data object that upon validation is configured for use a subsequent interaction between the primary device and a different third-party device by:
receiving, from the primary device, a series of queries comprising a current location of the mobile device;
determining a direction based at least in part on the series of queries, each of the series of queries comprising the current location at a time of reception;
determining based at least in part on the series of queries and the current location of each at the time of reception, wherein one or more of the determined direction or the series of queries is indicative of an outing or an errand;
querying an interaction database with the current location associated with a most recent query, and at least one of the determined direction, a time associated with the most recent query, or the indication of whether the series of queries or the direction is indicative of the errand or the outing; and
receiving, responsive to the querying, the data object, the data object indicative of a promotion; and
transmit, to the mobile device, an electronic communication comprising an indication, configured for rendering on the mobile device, of the data object.

19. The apparatus of claim 18, wherein the at least one memory and the computer program code are further configured to, with the at least one processor, cause the apparatus to:
receive, via the network, responsive to the transmission of the electronic communication, an indication of a validation event.

20. The apparatus of claim 19, wherein the reception of the indication of the validation event comprises:
receive a second electronic communication claiming the data object.

21. The apparatus of claim 18, wherein the determining of the data object as the function of the at least the first element and the location or the bounded region further comprises:
querying the interaction database using at least one of the first element and the second element; and receiving, responsive to querying the interaction database, one or more records matching at least one of the first element and the location or the bounded region, each of the one or more records matching the at least one of the first element or the second element, and being indicative of the data object, wherein the data object is an indication of a transmittable instrument configured for transmission to the mobile device and being rendered at the mobile device, and entitling a bearer, upon validation, to a redeemable instrument configured for use in the subsequent interaction.

22. The apparatus of claim 18, wherein the determining of the data object as the function of the at least the first element and the location or the bounded region further comprises:

accessing a corpus, wherein the corpus is comprised of one or more documents, each of the one or more documents representative of a pre-loaded or pre-associated data objects; and applying a particular machine-learning model to the corpus, classifying the documents in the corpus by real-time relevancy.

23. The apparatus of claim 18, wherein the subsequent interaction is a transaction and the promotion comprises a redeemable instrument is configured for use toward at least a portion of a purchase of goods or services.

24. The apparatus of claim 18, wherein the at least one memory and the computer program code are further configured to, with the at least one processor, cause the apparatus to:

query the interaction database utilizing an identifier indicative of the bounded region and a third element, the third element indicative of transaction information; and identify one or more records matching at least one of the first element and the location or the bounded region, the one or more records matching at least one of the first element and the second element indicative of a rebate or a discount on a subsequent visit.

25. The apparatus of claim 18, wherein the at least one memory and the computer program code are further configured to, with the at least one processor, cause the apparatus to:

query the interaction database utilizing an identifier indicative of the bounded region and a third element, the third element indicative of transaction information; and identify one or more records matching at least one of the first element and the second element, the one or more records matching at least one of the first element and the second element indicative of a related promotion.

26. The apparatus of claim 18, wherein the at least one memory and the computer program code are further configured to, with the at least one processor, cause the apparatus to:

query the interaction database utilizing an identifier indicative of the current location to identify one or more transmittable instruments associated with one or more nearby merchants.

27. The apparatus of claim 25, wherein the at least one memory and the computer program code are further configured to, with the at least one processor, cause the apparatus to:

associate the bounded region to a particular category identifier, and wherein the querying further utilizes the particular category identifier.

28. The apparatus of claim 18, wherein the at least one memory and the computer program code are further configured to with the at least one processor, cause the apparatus to:

enable a registration process, the registration process comprising one or more of receiving opt-in information, receiving registration of a payment method with an account, correlating the payment method with a user, receiving or identifying the phone number.

29. The apparatus of claim 18, wherein the at least one memory and the computer program code are further configured to, with the at least one processor, cause the apparatus to:

in an instance in which querying the interaction database returns at least one data object indication of a transmittable instrument with variable component, calculate the variable component.

30. The apparatus of claim 18, wherein the at least one memory and the computer program code are further configured to, with the at least one processor, cause the apparatus to:

responsive to transmitting the electronic communication comprising the data object, and wherein the data object is indicative of a at least one transmittable instrument, provide an availability of the at least one transmittable instrument until a total amount of claims associated with the at least one transmittable instrument is reached.

31. The apparatus of claim 18, wherein the current location is a GPS location.

32. The apparatus of claim 18, wherein the at least one memory and the computer program code are further configured to, with the at least one processor, cause the apparatus to:

responsive to transmitting the electronic communication comprising the data object and wherein the data object is indicative of at least one transmittable instrument, provide an availability of the at least one transmittable instrument for a predetermined time.

33. The apparatus of claim 18, wherein the at least one memory and the computer program code are further configured to, with the at least one processor, cause the apparatus to:

monitor movement of the primary device utilizing one or more of a series of received response to the querying, each of the received responses identifying a GPS location of the primary device; and responsive to the movement, modify an inventory of the interaction database with a set of pre-loaded promotions based at least in part on associating the GPS location with one or more nearby third-party devices.

34. The apparatus of claim 33, wherein the at least one memory and the computer program code are further configured to, with the at least one processor, cause the apparatus to:

prior to modifying the inventory of the interaction database, access a promotion database to determine an availability of a relevant promotion; and responsive to determining the availability of the relevant promotion, loading the relevant promotion.

35. A computer program product comprising at least one non-transitory computer-readable storage medium having computer-executable program code instructions stored therein, the computer-executable program code instructions comprising program code instructions for:

receiving, via a network, an indication of an electronic interaction between a primary device and a third-party device, the electronic interaction being a purchase transaction of products or services presently being transacted at the third-party device, and the indication comprising at least a first element and a second element, the first element indicative of user identification information as provided by the primary device during the electronic interaction and the second element indicative of payment information, the primary device being a credit card comprising a chip or magnetic strip;

determining a phone number of a mobile device associated with user identification information provided in the indication of the electronic interaction;

performing a location query of the mobile device, wherein the location query comprises transmitting a first location to the mobile device;

receiving, via the network, from the mobile device responsive to the location query, an indication of at least one of a location or a bounded region;

determining, as a function of at least the first element and the location or the bounded region, a data object that upon validation is configured for use during a subsequent interaction between the primary device and a different third-party device by:

receiving, from the primary device, a series of queries comprising a current location of the mobile device;

determining a direction based at least in part on the series of queries, each of the series of queries comprising the current location at a time of reception;

determining, based at least in part on the series of queries and the current location of each at the time of reception, whether one or more of the determined direction or the series of queries is indicative of an outing or an errand;

querying an interaction database with the current location associated with a most recent query, and at least one of the determined direction, a time associated with the most recent query, or the indication of whether the series of queries or the direction is indicative of the errand or the outing; and receiving, responsive to the querying, the data object, the data object indicative of a promotion; and transmitting, to the mobile device, an electronic communication comprising an indication, configured for rendering on the mobile device, of the data object.

36. The computer program product of claim 35, wherein the computer-executable program code instructions further comprise program code instructions for:

receiving, via the network, responsive to transmitting the electronic communication, an indication of a validation event.

37. The computer program product of claim 36, wherein the reception of the indication of the validation event comprises:

receiving a second electronic communication claiming the data object.

38. The computer program product of claim 35, wherein the determining of the data object as the function of the at least the first element and the location or the bounded region further comprises:

querying the interaction database using at least one of the first element and the second element; and receiving, responsive to querying the interaction database, one or more records matching at least one of the first element and the second element, each of the one or more records matching the at least one of the first element or the second element, and being indicative of the data object, wherein the data object is an indication of a transmittable instrument configured for transmission to the mobile device and being rendered at the mobile device, and entitling a bearer, upon validation, to a redeemable instrument configured for use in the subsequent interaction.

39. The computer program product of claim 35, wherein the determining of the data object as the function of the at least the first element and the location or the bounded region further comprises:

accessing a corpus, wherein the corpus is comprised of one or more documents, each of the one or more documents representative of a pre-loaded or pre-associated data objects; and applying a particular machine-learning model to the corpus, classifying the one or more documents in the corpus by real-time relevancy.

40. The computer program product of claim 35, wherein the subsequent interaction is a transaction and the promotion comprises a redeemable instrument is configured for use toward at least a portion of a purchase of goods or services.

41. The computer program product of claim 35, wherein the computer-executable program code instructions further comprise program code instructions for:

querying the interaction database utilizing an identifier indicative of the bounded region and a third element, the third element indicative of transaction information; and identifying one or more records matching at least one of the first element and the location or the bounded region, the one or more records matching at least one of the first element and the second element indicative of a rebate or a discount on a subsequent visit.

42. The computer program product of claim 35, wherein the computer-executable program code instructions further comprise program code instructions for:

querying the interaction database utilizing an identifier indicative of the bounded region and a third element, the third element indicative of transaction information; and identifying one or more records matching at least one of the first element and the second element, the one or more records matching at least one of the first element and the second element indicative of a related promotion.

43. The computer program product of claim 42, wherein the computer-executable program code instructions further comprise program code instructions for:

associating the bounded region to a particular category identifier, and wherein the querying further utilizes the particular category identifier.

44. The computer program product of claim 35, wherein the computer-executable program code instructions further comprise program code instructions for:

querying the interaction database utilizing an identifier indicative of the current location to identify one or more transmittable instruments associated with one or more nearby merchants.

45. The computer program product of claim 35, wherein the computer-executable program code instructions further comprise program code instructions for:

enabling a registration process, the registration process comprising one or more of receiving opt-in information, receiving registration of a payment method with an account, correlating the payment method with a user, or receiving or identifying the phone number.

46. The computer program product of claim 35, wherein the computer-executable program code instructions further comprise program code instructions for:
   in an instance in which querying the interaction database returns at least one data object indication of a transmittable instrument with variable component, calculating the variable component.

47. The computer program product of claim 35, wherein the computer-executable program code instructions further comprise program code instructions for:
   responsive to transmitting the electronic communication comprising the data object, and wherein the data object is indicative of at least one transmittable instrument, providing an availability of the at least one transmittable instrument until a total amount of claims associated with the at least one transmittable instrument is reached.

48. The computer program product of claim 35, wherein the current location is a GPS location.

49. The computer program product of claim 35, wherein the computer-executable program code instructions further comprise program code instructions for:
   responsive to transmitting the electronic communication comprising the data object and wherein the data object is indicative of at least one transmittable instrument, providing an availability of the at least one transmittable instrument for a predetermined time.

50. The computer program product of claim 35, wherein the computer-executable program code instructions further comprise program code instructions for:
   monitoring movement of the primary device utilizing one or more of a series of received response to the querying, each of the received responses identifying a GPS location of the primary device; and
   responsive to the movement, modifying an inventory of the interaction database with a set of pre-loaded promotions based at least in part on associating the GPS location with one or more nearby third-party devices.

51. The computer program product of claim 50, wherein the computer-executable program code instructions further comprise program code instructions for:
   prior to modifying the inventory of the interaction database, accessing a promotion database to determine an availability of a relevant promotion; and
   responsive to determining the availability of the relevant promotion, loading the relevant promotion.

\* \* \* \* \*